US012612259B2

(12) United States Patent　　　　　(10) Patent No.:　US 12,612,259 B2
Reiter et al.　　　　　　　　　　　　　　(45) Date of Patent:　　　Apr. 28, 2026

(54) BOARD FEEDER

(71) Applicant: Reiter Technical Services, Inc., Hot Springs, AR (US)

(72) Inventors: David M. Reiter, Hot Springs, AR (US); Matt Gustafson, Baton Rouge, LA (US)

( * ) Notice: Subject to any disclaimer, the term of this patent is extended or adjusted under 35 U.S.C. 154(b) by 68 days.

(21) Appl. No.: 18/657,468

(22) Filed: May 7, 2024

(65) Prior Publication Data

US 2025/0346433 A1　　Nov. 13, 2025

(51) Int. Cl.
　　*B65G 23/06*　　　　　(2006.01)
　　*B65G 37/00*　　　　　(2006.01)
(52) U.S. Cl.
　　CPC ............. *B65G 23/06* (2013.01); *B65G 37/00* (2013.01); *B65G 2201/0282* (2013.01)
(58) Field of Classification Search
　　CPC . B65G 23/06; B65G 37/00; B65G 2201/0282
　　　　　　　　(Continued)

(56) References Cited

U.S. PATENT DOCUMENTS

| 2,980,234 | A | * | 4/1961 | De Koning | ........ | B65G 47/1492 |
| | | | | | | 83/732 |
| 3,019,882 | A | * | 2/1962 | Pearson | ............. | B65G 47/1492 |
| | | | | | | 144/242.1 |
| 3,081,863 | A | * | 3/1963 | Monohan | ............. | B65G 47/295 |
| | | | | | | 198/460.1 |

* cited by examiner

*Primary Examiner* — Gene O Crawford
*Assistant Examiner* — Lester Rushin, III
(74) *Attorney, Agent, or Firm* — Joe D. Calhoun

(57)　　　　　　　ABSTRACT

A board feeder apparatus for a board conveying system that typically includes an infeed conveyor and an outfeed conveyor having a downstream end, and an upstream end overlapping with the board feeder apparatus which comprises an infeed end and an outfeed end, and an intermediate conveyance means for conveying boards transversely to the flow path essentially in edge-to-edge abutment of adjacent board trailing edges against subsequent board leading edges. Preferably the feeder apparatus further includes at least one cam wheel, each connected to a first drive shaft and having a circumferential edge defining a plurality of lobes. It also includes at least one acceleration wheel, each connected to the first drive shaft and having a circumference larger than that of said lobes. Also included is at least one first pivot-arm, each comprising a stop-end and a cam roller rollable atop the circumference of the lobes in accordance with rotation of the cam wheel by the drive shaft, said stop-end pivoting from a lowermost position below the bottom surface of the leading board and an uppermost position wherein the stop-end stops passage of the leading board onto the acceleration wheel. Also included is at least one biasing means of biasing the respective roller downwardly against the circumference of the cam wheel. During conveyance of boards down the board feeder apparatus, the stop-end in its uppermost position stops passage of the leading board until rotation of the drive shaft rotates the cam wheel and pivots the stop-end to its lowermost position so the conveyance means feeds the leading edge of the leading board onto the acceleration wheel, which pulls the leading board onto the outfeed conveyor. Ideally each stop end includes a roller reducing the friction with the underside of the leading board during pivoting, so conveyance to the acceleration wheel begins earlier (as the stop-end commences downward pivoting) and continues better even while the stop end pivots back upwardly and contacts the trailing portion of the departing leading board.

20 Claims, 11 Drawing Sheets

(58) Field of Classification Search
    USPC .......................................................... 198/586
    See application file for complete search history.

BOARD FEEDER

BACKGROUND OF THE INVENTION

(1) Field of the Invention

The present invention relates to systems for conveying boards at desired rates and in desired positioning that may be adjusted to meet current needs. More particularly, the invention disclosed herein relates to an improved mechanism for selectively feeding single boards from a first aggregation conveyor to a second selectivity conveyor at a high rate of speed, and smoothly to reduce errors and malfunctioning.

(2) Background of the Invention

Lumber processing is highly automated and, in certain processing stations, the boards need to be precisely spaced apart on the conveyor when entering a station. To achieve this spaced relationship, the boards are commonly transferred from a conveyor where the boards are in close or abutting relationship onto a second conveyor having lugs that determine the desired spacing. A feeding apparatus controls the transfer from one conveyor onto the other to assure the desired board positioning.

A typical feeding apparatus employs a stop mechanism and an intermediate pick-off wheel. The board movement is stopped on the first conveyor (although the conveyance means typically continue to slide under the boards) and each leading board in turn is picked off the first conveyor by the pick off wheel and carried over the stop member onto the next conveyor in timed sequence.

U.S. Pat. No. 2,980,234 issued to Koning describes a transfer mechanism that lifts the forward bottom edge of a board over a stop in order to transfer the board from a first conveyor to a second conveyor.

U.S. Pat. No. 6,431,345 issued to Burgener et al. discloses a board feeder transferring boards individually from an infeed conveyor onto a secondary conveyor. A descending infeed conveyor transports boards collectively in an edge-to-edge orientation until abutting a fixed stop. There is a cylinder actuated hook-raising preliminary stop before the fixed stop, which governs whether or not boards are allowed to continue being conveyed to the fixed stop to be lifted by the cam wheel over the fixed stop. A lobe of a cam wheel lifts the leading edge of the stopped leading board above the stop, while the first infeed conveyor continues to urge the abutting trailing boards to propel the leading board onto the second outfeed conveyor.

U.S. Pat. No. 8,978,872 issued to Raybon describes another dual conveyor system with a cam wheel having camming lobes on its periphery and arranged to engage a leading edge of the leading board that is engaging a stop, to lift the leading edge of the leading board over the stop during operation; concurrently, the first conveyor is urging continued movement of the plurality of abutting boards to move the leading board over the stop and onto the receiving end of said second conveyor. This system requires a cam wheel variable speed drive constructed and arranged for driving the cam wheel at variable speed, plus a cam wheel sensor in communication with the cam wheel to sense the location of the cam wheel; the system is governed or coordinated by a programmable control unit in communication with the lug sensor, the cam wheel sensor and the cam wheel variable speed drive for controlling operation of the cam wheel independent of the first and second conveyors. This system does not solve the problems associated with lifting each board over the stationary stop, such as causing misalignment of the board on the second conveyor or inability to move the last board over the stop an onto the second conveyor.

Also known in the field is a board feeding system having a pivoting stop arm actuated by airbags applying pressure on either side of a paddle downstanding from the pivot point; pivoting may also be actuated by a fluid-filed cylinder and piston-rod. The stop arm stops the edge-to-edge boards before the leading board reaches a fast acceleration wheel, having a quickly-rotating circumference that jettisons the leading board away from the trailing boards to create a gap that is sensed to signal actuation of upward pivoting of the stop arm to regulate the desired flow of individual boards onto the outfeed conveyor. However, since such systems require the stop arm to be completely raised within the gap, such gap-creating acceleration and pivoting fails to work consistently at the high speeds often preferred or required for economical production methods. (See http://www.usnr-.com/en/product/newtroniclugloadersm?dt=1; or https://baxleyequipment.com/equipment/baxley-boardfeeder-conventional/.)

None of the known prior art discloses a board feeder apparatus that optimizes gravitational force and propulsion by acceleration wheel, and the consistency and reliability of cam wheel actuation of pivoting, to provide an apparatus that feeds even the last board to the outfeed conveyor.

SUMMARY OF THE INVENTION

In general, the invention disclosed herein includes (comprises) a board feeder system accepting input of boards collectively transported or otherwise collectively conveyed by a first infeed conveyor, for the purpose of initially aligning the boards in an edge-to-edge orientation perpendicular (transverse) to the direction of travel downstream from the first infeed conveyor. The board feeder apparatus then separates each successive leading board from its trailing board(s), and pulls it powerfully and smoothly onto the outfeed conveyor while maintaining the desired orientation, for further processing.

The board feeder apparatus disclosed herein lowers the board stopping element rather than lifting the board over it. This takes less time and causes less disruption of the boards during their conveyance and separation. The board feeder apparatus also uses cam wheels (35) with lobes (36) to actuate the pivoting of the stop-end (39) upwardly and downwardly by having a pivot-arm roller (41) rolling along the circumference of the cam wheel as it rotates; and to assure that the pivot-arm accurately follows the contours of the lobes, a pneumatic cylinder (46) continuously pulls and tensions the pivot-arm roller against the circumference of the cam wheel. Additionally, the stop-end has a roller (40) at the tip, to reduce the friction-drag of the leading board sliding over the lowering stop-end (and the friction-drag of the roller re-raising into contact with the trailing portion of that departing leading board in preparation for stopping the next board). This accelerates leading board so that additional urging by the trailing board(s) is not necessary.

One primary objective and benefit of the disclosed invention is to provide a board feeder mechanism that does not require lifting the board over a stop, and that maintains the alignment of the board primarily due to the smoother feeding motion.

Another primary objective and benefit is to provide a board feeding apparatus that optimizes gravitational force and propulsion by acceleration wheel, and the consistency and reliability of cam wheel actuation of pivoting.

Another objective and benefit is to provide an apparatus that feeds even the last board to the outfeed conveyor.

Another objective and benefit is to provide a board feeder mechanism that can pause the movement of boards while the infeed and outfeed conveyors, and the conveyance means of the apparatus, remain moving.

Another objective and benefit of the disclosed invention is to provide a board feeder apparatus that allows the board to be fed to the next conveyor in a smoother motion than having to be lifted over a fixed stop.

These and other aspects of the disclosed subject matter, as well as additional novel features, will be apparent from the description provided herein. The intent of this summary is not to be a comprehensive description of the subject matter, but rather to provide a short overview of some of the subject matter's functionality. Other systems, methods, features and advantages herein provided will become apparent to one with skill in the art upon examination of the accompanying Figures and detailed description. It is intended that all such additional systems, methods, features and advantages that are included within this description, be within the scope of any claims filed now or later.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings.

Figure 1:
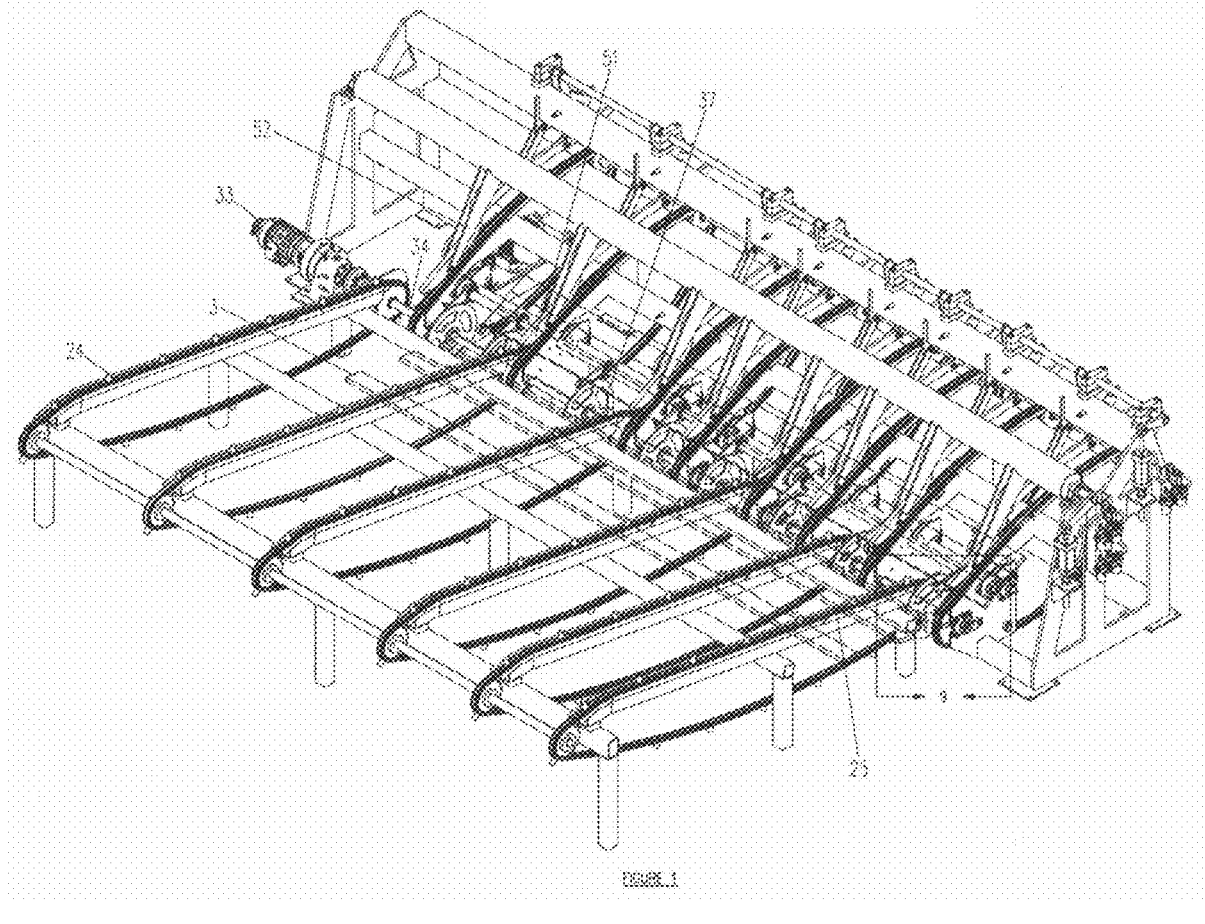
FIG. 1 is a perspective view of a representative sample of a board feeder together with a second outfeed conveyor, and having the features discovered by applicant.
Figure 2:
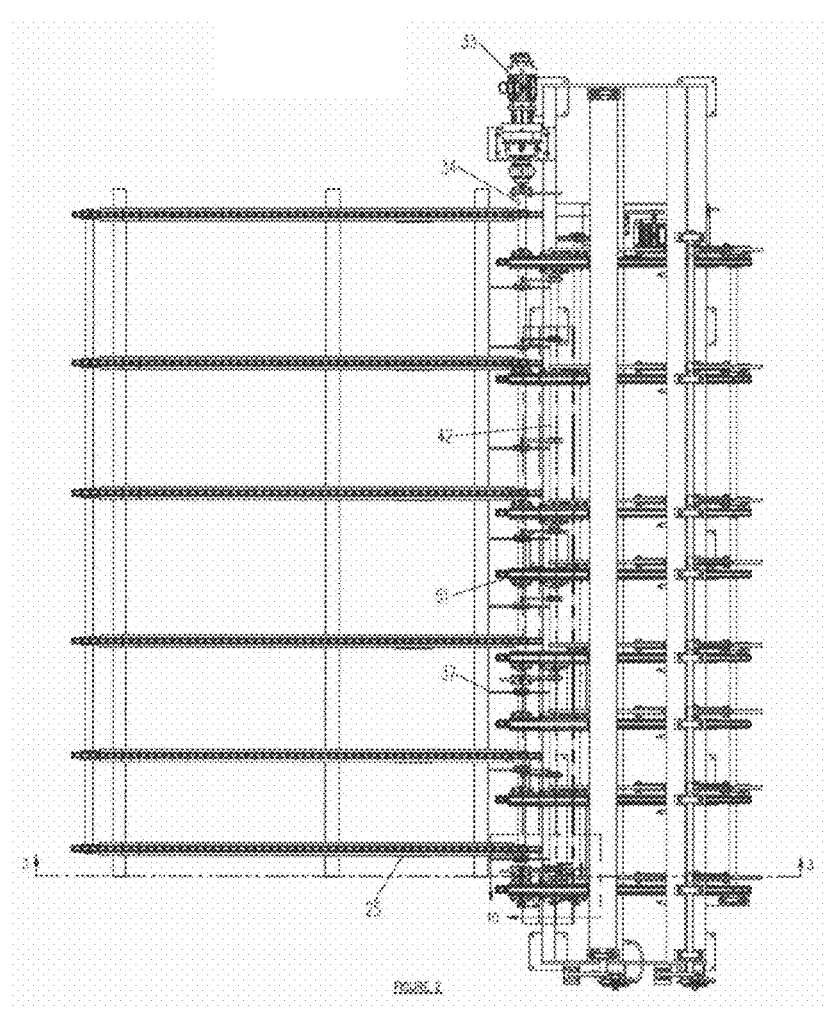
FIG. 2 is a top plan view of the board feeder and outfeed conveyor of FIG. 1, having a cross-section line 3-3 locating the vertical plane of cross-sectioning for later views; the direction of flow is shown as arrow 10.

These drawings illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising", or "includes" and/or "including", or "have" or "having", when used in this specification, specify the presence of stated features, regions, integers, steps, operations, elements and/or components, but do not preclude the presence or addition of one or more other features, regions, integers, steps, operations, elements, components and/or groups thereof.

For the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

It will be understood that, although the terms first, second, third, etc. may be used herein to describe various elements, these elements should not be limited by these terms. These terms are only used to distinguish one element from another element. Likewise, synonyms for the same element, term or concept may be used only to distinguish one similar element from another, unless the context clearly indicates otherwise.

The disclosure herein is not limited by construction materials to the extent that other materials satisfy the structural and/or functional requirements. For example, any material may be used so long as it satisfies the functional and structural requirements for which it is being used. In one embodiment, the device and/or system is constructed of steel; however, any material in a group of candidate materials sharing at least one function and/or structural feature will suffice as well. Likewise, the disclosed invention is not limited by any construction process or method, unless so indicated.

A device or system that is configured in a certain way is configured in at least that way, but it can also be configured in other ways than those specifically described, to accomplish the necessary functions.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any disclosed device, apparatus, system and/or method can consist of or consist essentially of (rather than comprise/include/have) any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb. Any method including multiple steps is not, but can be, limited to the order of the steps recited in the method.

The feature or features of one embodiment may be applied to or found in other embodiments, even though not described or illustrated, unless expressly prohibited by this disclosure or the nature of the embodiment or feature(s).

Figure 3:
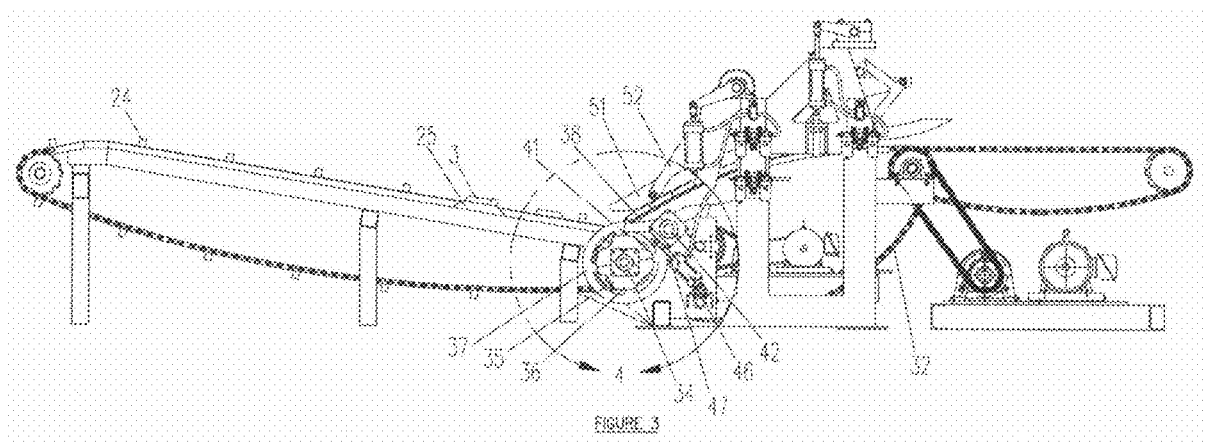
FIG. 3 is a side elevation view of the board feeder and outfeed conveyor of FIG. 1, with the stop-end of the pivot-arm fully raised to stop the feeding of the boards; also depicted are portions of a representative sample of an infeed conveyor, overlapping with the infeed end of the board feeder.

The inventions will be explained with reference to the attached Figures without being limited thereto. FIG. 3 illustrates a portion of a representative sample of a first infeed conveyor having an end overlapping with (or handing boards off to) the infeed end of an illustrative example of the board feeder apparatus, having an outfeed end overlapping with (or handing boards off to) an outfeed conveyor for further processing operations. The first infeed conveyor conveys boards (3) collectively being aligned in an edge-to-edge arrangement or abutment. The board feeder is preferably a descending chain type conveyor having circular chains (32) running through declining U-channels or tracks (31) towards the cam wheels (35), which regulate the stop-ends (39) to control the feeding of individual boards to the acceleration wheel (37) without lifting of the board over any stop. While the boards are stopped awaiting feeding, the chain of the board feeder continues to travel beneath the boards. But when the cam-controlled stop-arm pivots downwardly below the leading edge of the leading board, the leading board moves downwardly into contact with the circumferential edge of the nearby acceleration wheels. Those fast-rotating wheels smoothly and forcefully move the leading board onto the chain drive of the outfeed conveyor.

The outfeed conveyor has a plurality of circular chains (22), each traveling within a U-channel or track (21), and contacting each board to move it forward. Each chain carries a plurality of lugs (24) spaced periodically apart; the lugs of all chains across all tracks are coordinated to align each board in the alignment to be accomplished for the next milling operation. A riser (25) temporarily stops or slows each board near the beginning of the outfeed conveyor, to allow the trailing lug to catch up to the board for alignment for a subsequent operation such as (for example) cutting to appropriate length.

Typically, each of the three board-moving components are driven by a separate drive, although that is not necessarily required. In the example set forth herein, the board feeder has its own drive (33), as do the infeed conveyor (not shown) and outfeed conveyor (not shown). The board feeder can be retrofit into existing systems, with its drives and sensors regulated by, and coordinated with, the sensors and controllers of one or both other components of the system.

The boards (3) are typically held in position behind the stop-ends (39) with the aid of a hold-down mechanism. The hold-down mechanism has at least one elongate slide (51) that is pivotally mounted to an arm (52), and usually positioned a short distance above the moving boards. Typically there are a plurality of parallel hold-down mechanisms aligned along the flow path down the board feeder, ending just before the stop-ends. The hold-down mechanism assures that the plurality of boards (3) will remain in edge-to-edge abutment along the board feeder, and will prevent one board from flipping upwardly to be stacked atop another board.

Pivoting of the pivot-arms (and each's stop-end) is accomplished by a cam wheel (35) having a circumference or periphery defining camming lobes (36) contoured to raise or lower the stop-end when the cam wheel rotates. The cam wheel is driven by a variable speed drive. Although the figures depict a cam wheel with four lobes, any number of lobes may be used, depending upon the frequency desired or required for lowering and re-raising the stop-end.

A cam wheel sensor may be used to sense the location of the cam wheel. The cam wheel sensor can include an encoder (not shown) which senses the location and speed of the drive shaft to which the cam wheel is mounted. Alternatively, the cam wheel sensor comprises an encoder (not shown) that is internal to the drive, in conjunction with a shaft position reference switch mounted on shaft of the drive, such as, metal detecting proximity switch.

A lug sensor may be used to sense the location of the lugs. The lug sensor can also be used to determine the speed of the second conveyor; or optionally a second conveyor speed sensor can be used to determine the speed of the second conveyor. The lug sensor can be a position encoder that determines the position and speed of the drive shaft to which the drive gear and second conveyor are connected. By knowing the rotational position and speed of the drive shaft, the position of the lugs and speed of the second conveyor can be determined.

A programmable control unit may be in communication with the lug sensor, the cam wheel sensor and the cam wheel variable speed drive for controlling operation of the cam wheel independent of the first and second conveyors. The control unit can also be in communication with the drives for controlling the speeds of the first and second conveyors.

Any suitable computerized controller can be used to electronically synchronize the drives to track each other, plus allow for stops and starts independently.

In general, the invention disclosed herein includes a board feeder apparatus for a board conveying system known in the field as having an infeed conveyor, and an outfeed conveyor having a downstream end and an upstream end overlapping with the board feeder apparatus. The board feeder invention, positioned between the infeed conveyor and outfeed conveyor, may include an infeed end fed by the infeed conveyor, and an outfeed end feeding the outfeed conveyor, and an intermediate conveyance means for conveying boards transversely to the flow path essentially in edge-to-edge abutment of adjacent board trailing edges against subsequent board leading edges. The feeder apparatus may further include:

(a) at least one cam wheel, each connected to a first drive shaft and having a circumferential edge defining a plurality of lobes;

(b) at least one acceleration wheel, each connected to the first drive shaft and having a circumference larger than that of said lobes;

(c) at least one first pivot-arm, each may include a stop-end and a cam roller rollable along the circumference of the lobes in accordance with rotation of the cam wheel by the drive shaft, said stop-end pivoting from a lowermost position below the bottom surface of the leading board and an uppermost position wherein the stop-end stops passage of the leading board onto the acceleration wheel; and (d) at least one biasing means of biasing the respective roller against the circumference of the cam wheel.

During conveyance of boards down the board feeder apparatus, the stop-end in its uppermost position stops passage of the leading board until rotation of the drive shaft rotates the cam wheel and pivots the stop-end to its lowermost position; that allows the conveyance means to feed the leading edge of the leading board onto the acceleration wheel, which pulls the leading board onto the outfeed conveyor.

Any biasing means may be used that accomplishes the function of pressuring or tensioning the pivot-arm's cam roller down onto the upper surface of the cam wheel, to assure that the pivoting of the stop-end closely conforms to the movement dictated by the lobes of the cam wheel. The biasing preferably augments the force of gravity acting upon the pivot-arm, and can be coordinated with other biasing means to simultaneously pivot the stop-ends in unison. The biasing means may include a member selected from the group consisting of a piston rod telescopically received by a fluid-containing cylinder, a tension spring, or air bag, and combinations thereof. Preferably the biasing means include a piston rod telescopically received by a pneumatic cylinder.

The pivot-arm may preferably include a pivot point between the roller and the piston-rod connection. In such an arrangement, the biasing is accomplished by the pneumatic cylinder and piston-rod pulling the roller against the circumference of the cam wheel as it rotates. Ideally the biasing means literally pulls the pivot-arm down the steepest "dropoff" of the circumference of the cam wheel, to quickly lower the stop-end, then allows the incline of the cam wheel circumference to accurately re-raise the stop-end immediately before the new leading board arrives.

The pivot point may include a pivot-shaft (42) linked to pivoting of a first pivot-arm. This will enable a cam wheel to simultaneously actuate the pivoting of a plurality of pivot-arms that do not require any biasing means or cam rollers. Accordingly, the board feeder apparatus may further include at least one second pivot-arm, each of which may include a stop-end and be connected to the pivot-shaft for simultaneous coordinated pivoting with the first pivot-arm(s).

The stop-end may include a roller (40) reducing friction between the leading board and the stop-end during pivoting to its lowermost position. This enables releasing the leading board with sufficient momentum for movement of its leading edge onto the acceleration wheel without further urging by any trailing board(s). Accordingly, the invention disclosed has added utility, and is distinguishable from the prior art, by providing a board feeder that will feed the last board by itself, and using a much simpler and/or faster feeding mechanism.

The conveyance means for conveying boards transversely down the flow path may include a plurality of parallel tracks, each having a circular feeder chain pulled beneath the boards for applying downstream force against the underside of each board. Moreover, the flow path smoothly transitions from an essentially horizontal flow path at the infeed end and descends toward the outfeed end at a slope ranging between about 10 degrees to about 50 degrees, to optimize the forces of gravity, momentum and the conveyance means for feeding of the leading edge of the leading board onto the acceleration wheel. Ideally, the flow path descends at a slope of about 30 degrees.

The board feeder apparatus may further include a hold-down means above the boards for maintaining the edge-to-edge abutment of the boards in a single layer from the infeed end to the outfeed end. Preferably the hold-down means may include a plurality of slides situated parallel to the tracks, directly above the transverse boards. Preferably, each slide is separated from the boards traveling below, by a distance of between about one-eighth ($\frac{1}{8}^{th}$) of an inch to less than the thickness of the boards; such distancing allows the boards to travel freely (without the drag or friction caused by contact with the slides), yet be prevented from becoming double-stacked. Ideally, each slide has an upstream end diverging from parallel to the tracks a sufficient angulation to funnel the boards in a single layer of edge-to-edge abutment.

The board feeder apparatus may further include an encoder (not shown) sensing the position of the cam wheel for actuating the drive shaft. It may further include the outfeed conveyor that is horizontal or ascending at a slope of about 1 to 10 degrees; the outfeed conveyor may further include an encoder (not shown) sensing the position of a plurality of lugs carried by a circular drive chain driven by a second drive shaft. The feeder apparatus may further include a programmable logic controller coordinating the release of the leading board by lowering of the stop-end of the stop-arm for the acceleration wheel pulling of the leading board onto the outfeed conveyor.

Figure 4:
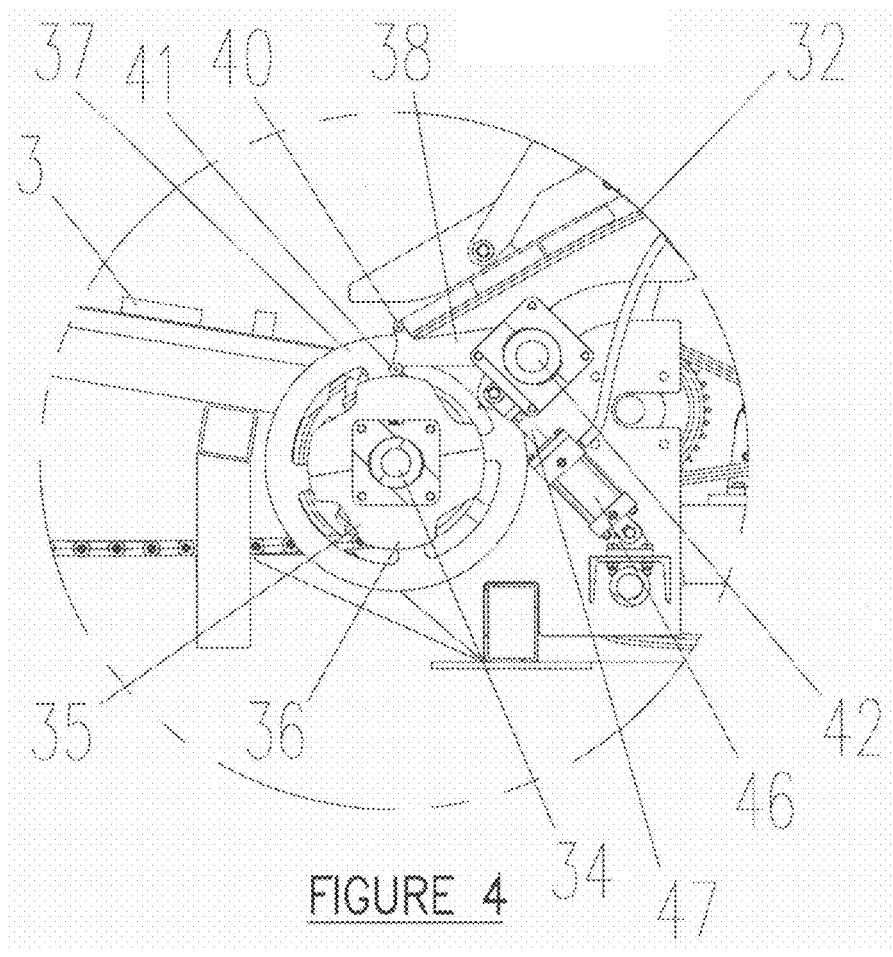
FIG. 4 is a close-up side elevation view of the encircled portion of FIG. 3.
Figure 5:
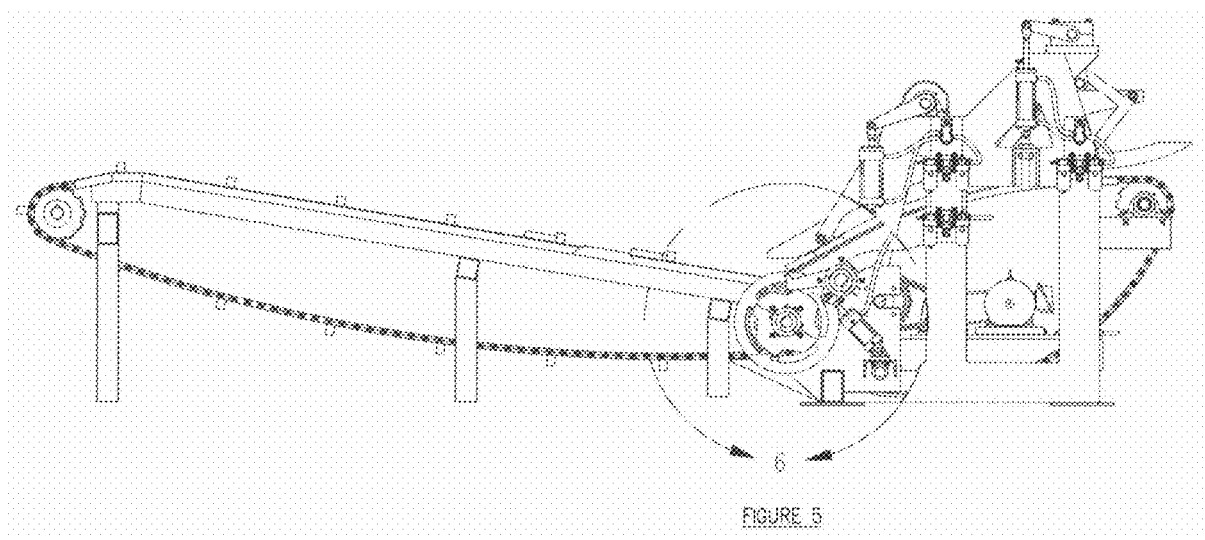
FIG. 5 is a side elevation view of the board feeder and outfeed conveyor of FIG. 1, with the stop-end of the pivot-arm fully lowered to enable the feeding of the boards.
Figure 6:
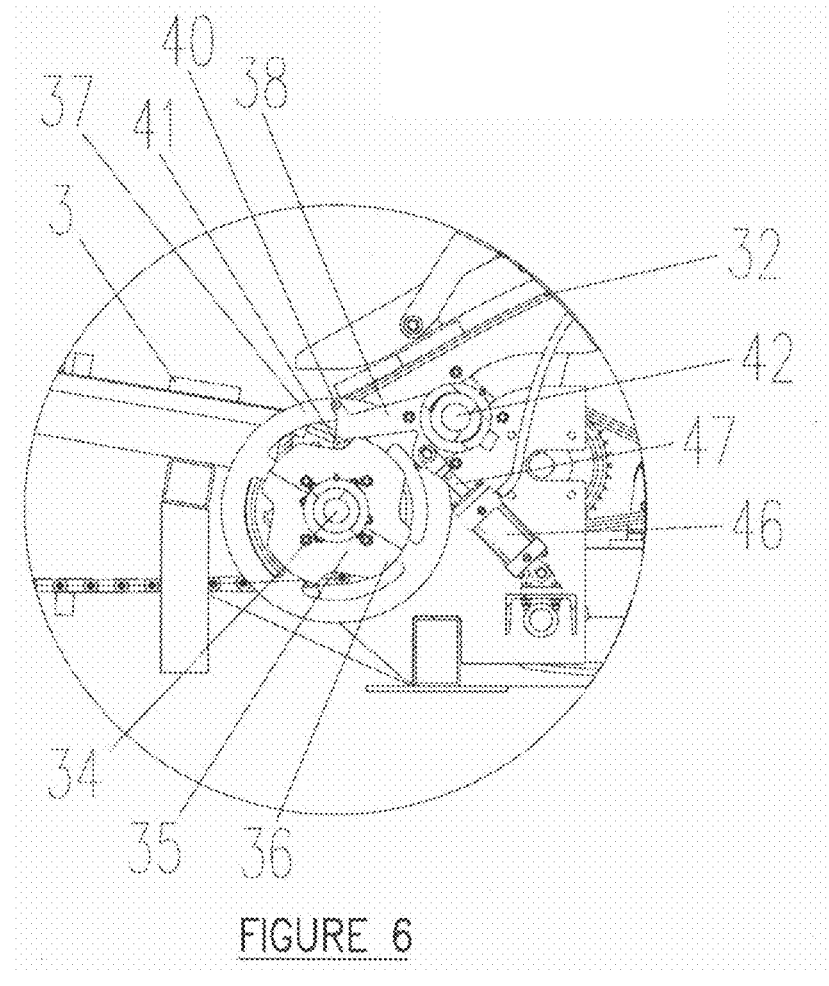
FIG. 6 is a close-up side elevation view of the encircled portion of FIG. 5.
Figure 7:
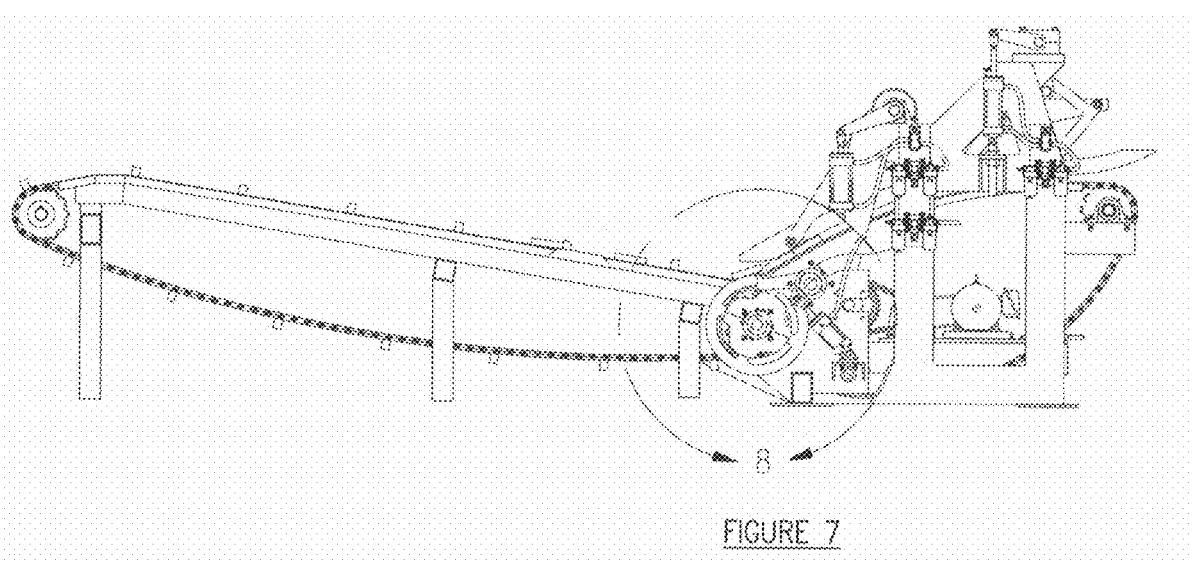
FIG. 7 is a side elevation view of the board feeder and outfeed conveyor of FIG. 1, with the stop-end of the pivot-arm partially raised beneath the trailing portion of the leading board.
Figure 8:
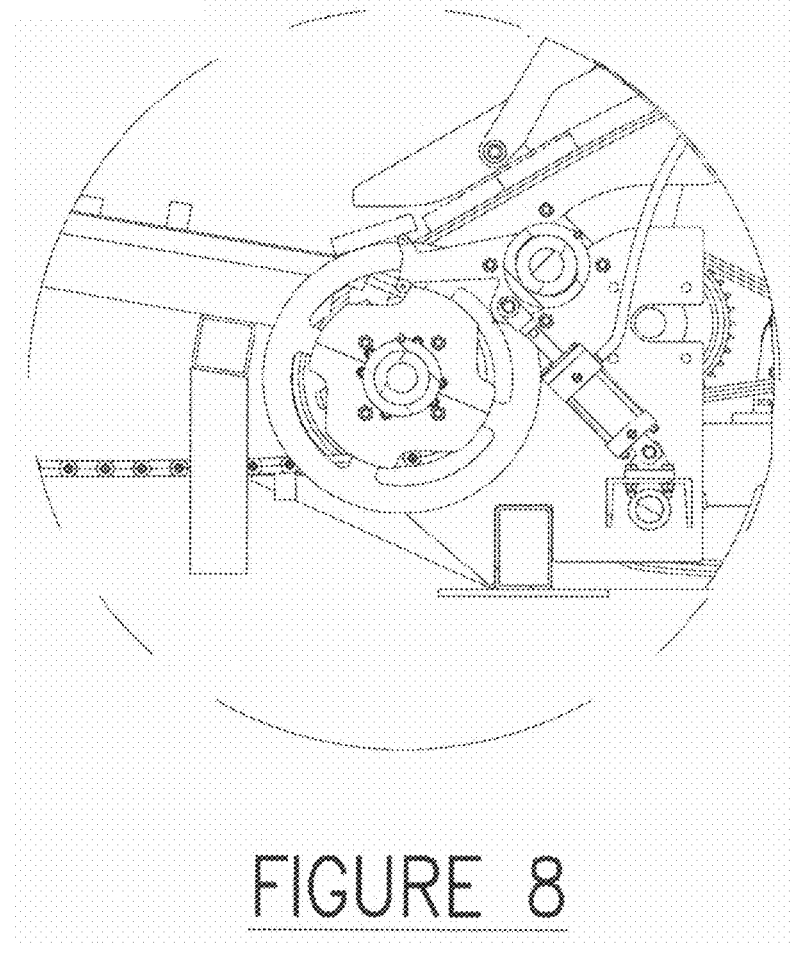
FIG. 8 is a close-up side elevation view of the encircled portion of FIG. 7.
Figure 9:
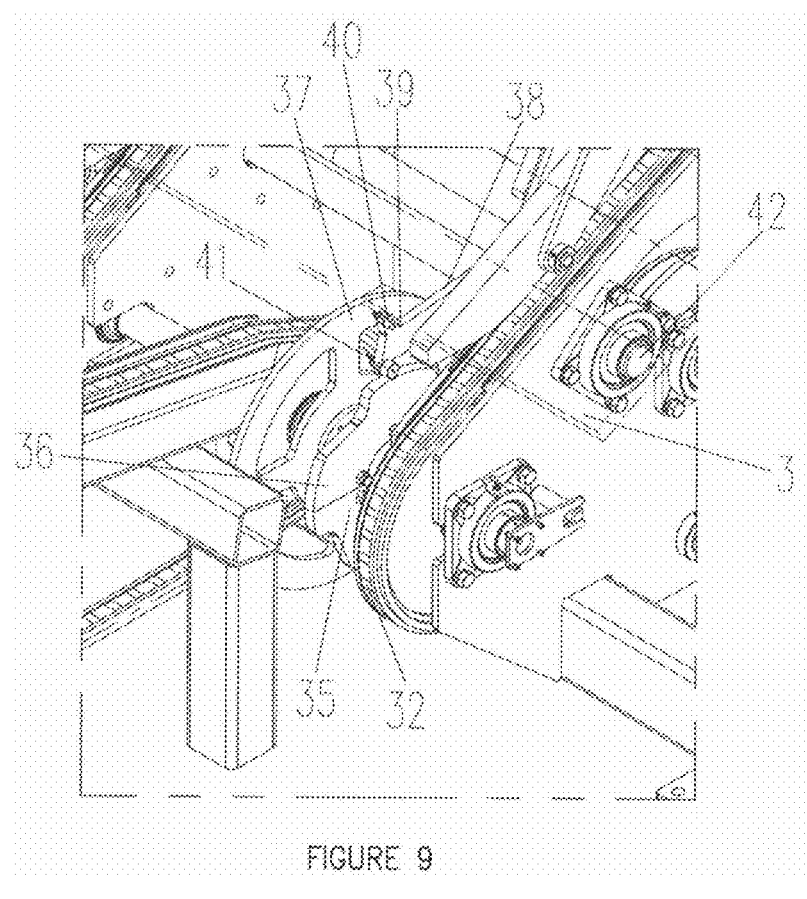
FIG. 9 is a perspective view of the configuration depicted in FIG. 3, viewed from downstream of the abutting boards.
Figure 10:
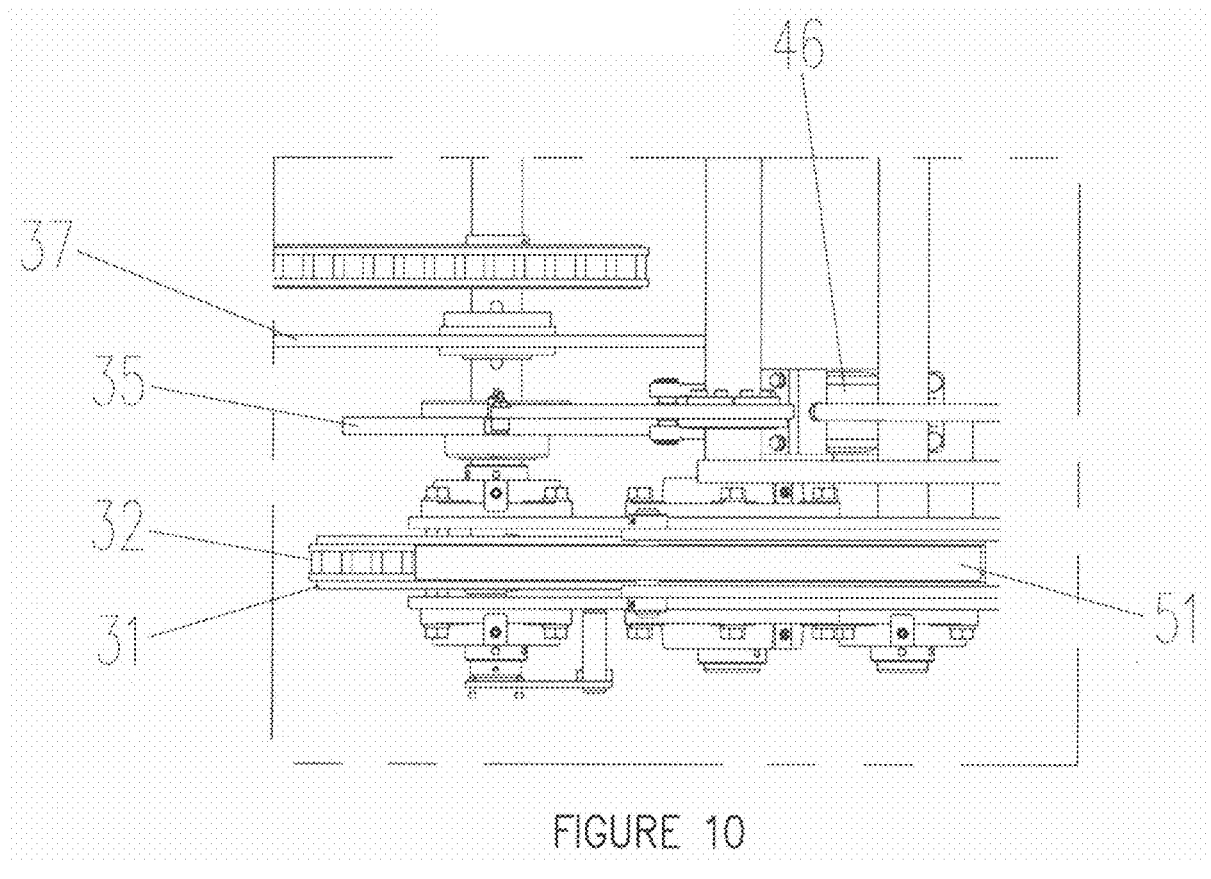
FIG. 10 is a top plan view of the portion of FIG. 4 demarcated.
Figure 11:
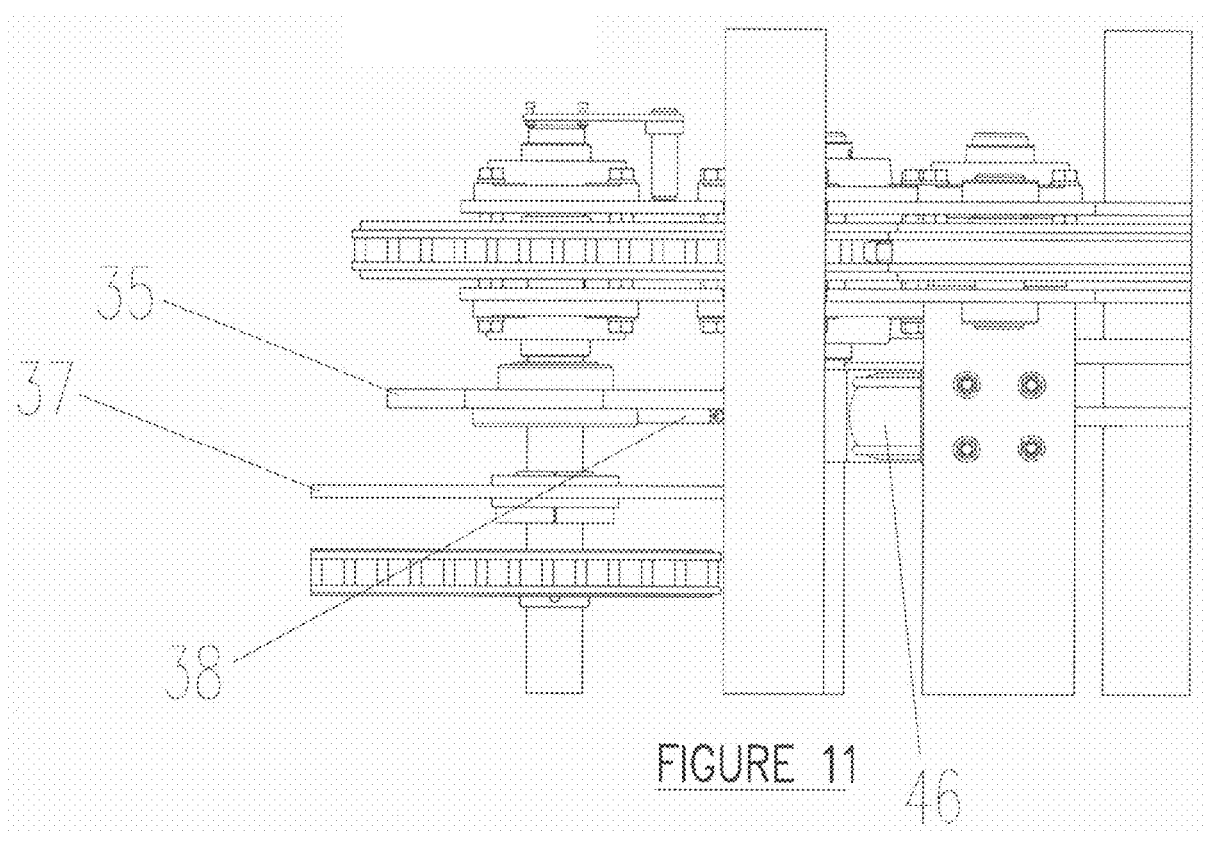
FIG. 11 is a bottom plan view of the portion of FIG. 4 demarcated.

A more specific embodiment of the board feeder apparatus may include an infeed end and an outfeed end and an intermediate conveyance means for conveying boards transversely to the flow path essentially in edge-to-edge abutment of adjacent board trailing edges against subsequent board leading edges. The feeder apparatus may further include:

(a) a plurality of cam wheels (35), each connected to a first drive shaft (34) and having a circumferential edge defining a plurality of lobes (36);

(b) a plurality of acceleration wheels (37), each connected to the first drive shaft and having a circumference larger than that of said lobes;

(c) a plurality of first pivot-arms (38), each including a stop-end (39) and a roller (41) rollable atop the circumference of the lobes of an associated cam wheel in accordance with rotation of said cam wheel by the drive shaft, said stop-end pivoting from a lowermost position below the bottom surface of the leading board (as shown in FIG. 6) and an uppermost position (as shown in FIG. 4) wherein the stop-ends stop passage of the leading board onto the acceleration wheel, at least one of said first pivot-arms may further include a first pivot point situated between said pivot-end and a bias-connection end; and (d) at least one biasing means of biasing at least one roller downwardly against the circumference of the cam wheel, which may include a piston rod (47) telescopically received by a pneumatic cylinder (46) and connected to said bias-connection end.

During conveyance of boards down the board feeder apparatus, each stop-end in its uppermost position stops passage of the leading board until rotation of the first drive shaft rotates each cam wheel and pivots the respective stop-end (39) to its lowermost position so the conveyance means feeds the leading edge of the leading board onto the acceleration wheel (37), which smoothly pulls the leading board onto the outfeed conveyor. In one embodiment, the stop-ends stop passage of the leading board onto the acceleration wheel by positioning the leading edge of the leading board approximately one-eighth ($\frac{1}{8}^{th}$) of an inch from the circumferential edge of the acceleration wheel.

For a feeder apparatus capable of feeding or sorting boards of various lengths up to 20 feet (for example), preferably the drive shaft (34) will power a cam wheel (35) and acceleration wheel (37) positioned close to each end of that 20-foot wide flow path. A pivot-arm (38) and its biasing means will be associated with one of those cam wheels. The cam wheel on the other end may be associated with a separate pivot-arm and biasing means. Or alternatively, the pivot-arm for that other end may be linked to pivot-shaft (42) linked to the cam-wheel actuated pivot-arm on the opposite end.

Accordingly, the board feeder apparatus may include a pivot-shaft linked to pivoting of a first pivot-arm, while the board feeder apparatus may further include at least one second pivot-arm, each including a stop-end and connected to said pivot-shaft for simultaneous coordinated pivoting with said first pivot-arms.

Each stop-end may include a roller (40) reducing friction between the leading board and the stop-end during pivoting to and from its lowermost position, and releasing the leading board with sufficient momentum for movement of its leading edge onto the acceleration wheel without further urging by any trailing board(s). Accordingly, conveyance to the acceleration wheel begins earlier (as the stop-end commences downward pivoting) and continues better even while the stop end pivots back upwardly and contacts the trailing portion of the departing leading board.

The infeed conveyance means for conveying boards transversely may include a plurality of parallel tracks (11), each having a circular feeder chain (12) pulled beneath the boards for downstream force against the underside of the boards.

The flow path smoothly transitions from an essentially horizontal flow path at the infeed end and descending toward the outfeed end at a slope of about 30 degrees, to optimize the forces of gravity, momentum and the conveyance means for movement of the leading edge of the leading board onto the acceleration wheel.

The board feeder apparatus may further include a hold-down means above the boards, which may include a plurality of slides (51) situated parallel to the tracks (31), for maintaining the edge-to-edge abutment of the boards in a single layer from the infeed end to the outfeed end, each slide having an upstream end diverging from parallel to the tracks a sufficient angulation to funnel the boards in a single layer of edge-to-edge abutment.

The board feeder apparatus may further include an encoder (not shown) sensing the position of at least one cam wheel for actuating the drive shaft. The board feeder may further include the outfeed conveyor ascending at a slope of about 1 to about 10 degrees; the outfeed conveyor may further include an encoder (not shown) sensing the position of a plurality of lugs carried by a circular drive chain driven by a second drive shaft. The board feeder may further include a programmable logic controller coordinating the release of the leading board by lowering of the stop-ends of the stop-arms for the acceleration wheel pulling of the leading board onto the outfeed conveyor.

Although the present disclosure and its advantages have been described in detail, it should be understood that various changes, substitutions and alterations can be made herein without departing from the spirit and scope of the design as defined by the appended claims. The scope of the present application is not intended to be limited to the particular embodiments of the process, machine, manufacture, composition of matter, means, methods and/or steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The scope of the present application is not intended to be limited to the particular embodiments of the process, machine, manufacture, composition of matter, means, methods and steps described in the specification.

While a preferred embodiment of the present invention has been described, it should be understood that various changes, adaptations and modifications may be made therein without departing from the spirit of the invention. Changes may be made in details, particularly in matters of shape, size, material, and arrangement of parts without exceeding the scope of the invention.

While the forms of apparatus herein described constitute preferred embodiments of the invention, it is to be understood that the invention is not limited to these precise forms of apparatus, and that changes may be made therein without departing from the scope and spirit of the invention as defined in the appended claims.

Those skilled in the art will recognize improvements and modification to the preferred embodiments of the present disclosure. All such improvements and modifications are considered within the scope of the concepts disclosed herein and the claims that follow.

We claim:

1. A board feeder apparatus for a board conveying system including an unclaimed infeed conveyor and an outfeed conveyor having a downstream end, and an upstream end overlapping with the board feeder apparatus comprising an infeed end and an outfeed end and an intermediate conveyance means for conveying boards transversely to the flow path essentially in edge-to-edge abutment of adjacent board trailing edges against subsequent board leading edges, the feeder apparatus further comprising:

(a) at least one cam wheel, each connected to a first drive shaft and having a circumferential edge defining a plurality of lobes;

(b) at least one acceleration wheel, each connected to the first drive shaft and having a circumference larger than that of said lobes;

(c) at least one first pivot-arm, each comprising a stop-end and a cam roller rollable along the circumference of the lobes in accordance with rotation of the cam wheel by the drive shaft, said stop-end pivoting from a lowermost position below the bottom surface of the leading board and an uppermost position wherein the stop-end stops passage of the leading board onto the acceleration wheel; and (d) at least one biasing means of biasing the respective roller against the circumference of the cam wheel;

wherein during conveyance of boards down the board feeder apparatus, the stop-end in its uppermost position stops passage of the leading board until rotation of the drive shaft rotates the cam wheel and pivots the stop-end to its lowermost position so the conveyance means feeds the leading edge of the leading board onto the acceleration wheel, which pulls the leading board onto the outfeed conveyor.

2. A board feeder apparatus described in claim 1, said biasing means comprising a member selected from the group consisting of a piston rod telescopically received by a fluid-containing cylinder, a tension spring, or air bag, and combinations thereof.

3. A board feeder apparatus described in claim 1, said biasing means comprising a piston rod telescopically received by a pneumatic cylinder.

4. A board feeder apparatus described in claim 3, wherein said pivot-arm includes a pivot point between the roller and the piston-rod, said biasing accomplished by the pneumatic cylinder and piston-rod pulling the roller against the circumference of the cam wheel.

5. A board feeder apparatus described in claim 4, said pivot point comprising a pivot-shaft linked to pivoting of the first pivot-arm, the board feeder apparatus further comprising at least one second pivot-arm, each comprising a stop-end and connected to said pivot-shaft for simultaneous coordinated pivoting with said first pivot-arm(s).

6. A board feeder apparatus described in claim 1, wherein the stop-end comprises a roller reducing friction between the leading board and the stop-end during pivoting, and releasing the leading board with sufficient momentum for movement of its leading edge onto the acceleration wheel without further urging by any trailing board(s).

7. A board feeder apparatus described in claim 6, wherein the conveyance means for conveying boards transversely comprises a plurality of parallel tracks, each having a circular feeder chain pulled beneath the boards for downstream force against the underside of each board.

8. The board feeder apparatus described in claim 7, wherein the flow path smoothly transitions from an essentially horizontal flow path at the infeed end and descends toward the outfeed end at a slope ranging between about 10 degrees to about 50 degrees, to optimize the forces of gravity, momentum and the conveyance means for feeding of the leading edge of the leading board onto the acceleration wheel.

9. A board feeder apparatus described in claim 8, wherein said flow path descends at a slope of about 30 degrees.

10. A board feeder apparatus described in claim 1, further comprising a hold-down means above the boards for maintaining the edge-to-edge abutment of the boards in a single layer from the infeed end to the outfeed end.

11. The board feeder apparatus described in claim 10, the hold-down means comprising a plurality of slides situated parallel to the tracks.

12. The board feeder apparatus described in claim 1, each slide having an upstream end diverging upward from parallel to the tracks a sufficient angulation to funnel the boards in a single layer of edge-to-edge abutment.

13. A board feeder apparatus described in claim 1, further comprising an encoder sensing the position of the cam wheel for actuating the drive shaft, said board feeder apparatus further comprising said outfeed conveyor ascending at a slope of about 1 to about 10 degrees and which further comprises an encoder sensing the position of a plurality of lugs carried by a circular drive chain driven by a second drive shaft, and further comprising a programmable logic controller coordinating the release of the leading board by lowering of the stop-end of the stop-arm for the acceleration wheel pulling of the leading board onto the outfeed conveyor.

14. A board feeder apparatus for a board conveying system including an unclaimed infeed conveyor and an outfeed conveyor having a downstream end, and an upstream end overlapping with the board feeder apparatus comprising an infeed end and an outfeed end and an intermediate conveyance means for conveying boards transversely to the flow path essentially in edge-to-edge abutment of adjacent board trailing edges against subsequent board leading edges, the feeder apparatus further comprising:

(a) a plurality of cam wheels, each connected to a first drive shaft and having a circumferential edge defining a plurality of lobes;

(b) a plurality of acceleration wheels, each connected to the first drive shaft and having a circumference larger than that of said lobes;

(c) a plurality of first pivot-arms, each comprising a stop-end and a roller rollable atop the circumference of the lobes of an associated cam wheel in accordance with rotation of said cam wheel by the drive shaft, said stop-end pivoting from a lowermost position below the bottom surface of the leading board and an uppermost position wherein the stop-end stops passage of the leading board onto the acceleration wheel, at least one of said first pivot-arms further comprising a first pivot point situated between said pivot-end and a bias-connection end; and (d) at least one biasing means of biasing at least one roller downwardly against the circumference of the cam wheel, comprising a piston rod telescopically received by a pneumatic cylinder and connected to said bias-connection end;

wherein during conveyance of boards down the board feeder apparatus, each stop-end in its uppermost position stops passage of the leading board until rotation of the first drive shaft rotates each cam wheel and pivots the respective stop-end to its lowermost position so the conveyance means feeds the leading edge of the leading board onto the acceleration wheel, which smoothly pulls the leading board onto the outfeed conveyor.

15. A board feeder apparatus described in claim 14, said pivot point comprising a pivot-shaft linked to pivoting of the first pivot-arms, the board feeder apparatus further comprising at least one second pivot-arm, each comprising a stop-end and connected to said pivot-shaft for simultaneous coordinated pivoting with said first pivot-arms.

16. A board feeder apparatus described in claim 14, wherein each stop-end comprises a roller reducing friction between the leading board and the stop-end during pivoting, and releasing the leading board with sufficient momentum for movement of its leading edge onto the acceleration wheel without further urging by any trailing board(s).

17. A board feeder apparatus described in claim 15, wherein the conveyance means for conveying boards transversely comprises a plurality of parallel tracks, each having a circular feeder chain pulled beneath the boards for downstream force against the underside of the boards.

18. The board feeder apparatus described in claim 17, wherein the flow path smoothly transitions from an essentially horizontal flow path at the infeed end and descends toward the outfeed end at a slope of about 30 degrees, to optimize the forces of gravity, momentum and the conveyance means for movement of the leading edge of the leading board onto the acceleration wheel.

19. A board feeder apparatus described in claim 18, further comprising a hold-down means above the boards, comprising a plurality of slides situated parallel to the tracks, for maintaining the edge-to-edge abutment of the boards in a single layer from the infeed end to the outfeed end, each slide having an upstream end diverging upwardly from parallel to the tracks a sufficient angulation to funnel the boards in a single layer of edge-to-edge abutment.

20. A board feeder apparatus described claim 14, further comprising an encoder sensing the position of at least one cam wheel for actuating the drive shaft, said board feeder apparatus further comprising said outfeed conveyor ascending at a slope of about 1 to about 10 degrees and which further comprises an encoder sensing the position of a plurality of lugs carried by a circular drive chain driven by a second drive shaft, and further comprising a programmable logic controller coordinating the release of the leading board by lowering of the stop-ends of the stop-arms for the acceleration wheel pulling of the leading board onto the outfeed conveyor.

\* \* \* \* \*